US012186822B2

(12) United States Patent
Iizuka et al.

(10) Patent No.: US 12,186,822 B2
(45) Date of Patent: Jan. 7, 2025

(54) METHOD FOR MANUFACTURING RAIL, AND RAIL

(71) Applicant: JFE STEEL CORPORATION, Tokyo (JP)

(72) Inventors: Naoki Iizuka, Tokyo (JP); Ryo Matsuoka, Tokyo (JP); Minoru Honjo, Tokyo (JP); Shigeo Okamoto, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 797 days.

(21) Appl. No.: 17/431,838

(22) PCT Filed: Feb. 13, 2020

(86) PCT No.: PCT/JP2020/005536
§ 371 (c)(1),
(2) Date: Aug. 18, 2021

(87) PCT Pub. No.: WO2020/170930
PCT Pub. Date: Aug. 27, 2020

(65) Prior Publication Data
US 2022/0145546 A1 May 12, 2022

(30) Foreign Application Priority Data
Feb. 19, 2019 (JP) .................. 2019-027604

(51) Int. Cl.
*B23K 11/16* (2006.01)
*B23K 11/04* (2006.01)
(Continued)

(52) U.S. Cl.
CPC ............. *B23K 11/16* (2013.01); *B23K 11/04* (2013.01); *C22C 38/02* (2013.01); *C22C 38/04* (2013.01);
(Continued)

(58) Field of Classification Search
CPC ......... C22C 38/24; C22C 38/02; C22C 38/04; C22C 38/06; C22C 38/22; C22C 38/26;
(Continued)

(56) References Cited

U.S. PATENT DOCUMENTS 10,253,397 B2 * 4/2019 Kimura ................... C22C 38/14
10,472,693 B2 * 11/2019 Kijima ................. C21D 9/0062
(Continued)

FOREIGN PATENT DOCUMENTS

AU 690457 B2 * 5/1996
CA 2869964 A1 10/2013
(Continued)

OTHER PUBLICATIONS

Jan. 9, 2024, Office Action issued by the Canadian Intellectual Property Office in the corresponding Canadian Patent Application No. 3,130,738.

(Continued)

*Primary Examiner* — Zachary L Kuhfuss
*Assistant Examiner* — Cheng Lin
(74) *Attorney, Agent, or Firm* — KENJA IP LAW PC

(57) ABSTRACT

Proposed are the welding conditions under which welds are always stably formed such that the difference in hardness between flash-butt welds and rail base metal and the deflection in a bending test are in better ranges. A plurality of pieces of rail base metal are joined via welds formed by flash-butt welding, where the rail base metal has a chemical composition containing C: 0.60 to 1.20 mass %, Si: 0.10 to 1.50 mass %, Mn: 0.10 to 1.50 mass %, and Cr: 0.10 to 1.50 mass %, with the balance being Fe and inevitable impurities, and the flash-butt welding is performed with an amount of welding heat input of $1.50 \times 10^5$ kA$^2$×sec or more and $4.50 \times 10^5$ kA$^2$×sec or less.

4 Claims, 3 Drawing Sheets

(51) Int. Cl.
  *C22C 38/02* (2006.01)
  *C22C 38/04* (2006.01)
  *C22C 38/06* (2006.01)
  *C22C 38/20* (2006.01)
  *C22C 38/22* (2006.01)
  *C22C 38/24* (2006.01)
  *C22C 38/26* (2006.01)
  *C22C 38/28* (2006.01)
  *C22C 38/32* (2006.01)
  *C22C 38/40* (2006.01)
  *E01B 5/08* (2006.01)
  *B23K 101/26* (2006.01)

(52) U.S. Cl.
  CPC .............. *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/40* (2013.01); *E01B 5/08* (2013.01); *B23K 2101/26* (2018.08)

(58) Field of Classification Search
  CPC ......... C22C 38/28; C22C 38/32; C22C 38/40; B23K 11/04; B23K 11/16; B23K 2101/26; E01B 5/02; E01B 5/08; E01B 5/00
  See application file for complete search history.

(56) References Cited

U.S. PATENT DOCUMENTS

| | | | |
|---|---|---|---|
| 10,870,165 B2 | 12/2020 | Lu et al. | |
| 2015/0152516 A1* | 6/2015 | Kimura | C22C 38/42 148/333 |

FOREIGN PATENT DOCUMENTS

| | | | | |
|---|---|---|---|---|
| CN | 1306893 | A | | 8/2001 |
| CN | 105382391 | A | | 3/2016 |
| CN | 106334863 | A * | 1/2017 | ............. B23K 11/04 |
| CN | 107520529 | A | | 12/2017 |
| CN | 106334863 | B | | 9/2018 |
| EP | 2415885 | A1 | | 2/2012 |
| EP | 2495064 | A1 | | 9/2012 |
| EP | 2845913 | A1 | | 3/2015 |
| GB | 2403174 | A | | 12/2004 |
| JP | 2000144325 | A | | 5/2000 |
| JP | 2002030341 | A * | 1/2002 | |
| JP | 2010100937 | A * | 5/2010 | |
| JP | 2010188382 | A | | 9/2010 |
| JP | 2011251335 | A | | 12/2011 |
| JP | 5532789 | B2 | | 6/2014 |
| JP | 5659965 | B2 | | 1/2015 |

OTHER PUBLICATIONS

Jan. 19, 2023, Office Action issued by the Canadian Intellectual Property Office in the corresponding Canadian Patent Application No. 3,130,738.

Jul. 26, 2022, Office Action issued by the China National Intellectual Property Administration in the corresponding Chinese Patent Application No. 202080015009.3 with English language search report.

Mar. 30, 2022, the Extended European Search Report issued by the European Patent Office in the corresponding European Patent Application No. 20759785.7.

Apr. 13, 2022, Office Action issued by the China National Intellectual Property Administration in the corresponding Chinese Patent Application No. 202080015009.3 with English language search report.

Apr. 14, 2020, International Search Report issued in the International Patent Application No. PCT/JP2020/005536.

Aug. 25, 2020, Notification of Reasons for Refusal issued by the Japan Patent Office in the corresponding Japanese Patent Application No. 2020-528348 with English language Concise Statement of Relevance.

* cited by examiner

METHOD FOR MANUFACTURING RAIL, AND RAIL

TECHNICAL FIELD

This disclosure relates to a method for manufacturing a rail, specifically, a method for manufacturing a long rail by continuously joining a plurality of pieces of rail base metal by flash-butt welding. In addition, this disclosure particularly relates to a method for manufacturing a long-life rail in which fracture at welds by flash-butt welding can be suppressed, and a rail. The rail of the present disclosure and the manufacturing method thereof are suitable for rails used under severe high-axle load conditions, such as for overseas mining railways with heavy freight cars and many sharp curves.

BACKGROUND

In heavy haul railways mainly built to transport ore or the like, the load applied to the axle of a freight car is much higher than that in passenger cars, and rails are used in increasingly harsh environments. In recent years, the loading weight of freight cars has been further increased to improve the transportation efficiency of rails. It is noted that heavy haul railways are railways where trains and freight cars haul large loads (the loading weight per freight car is, for example, about 150 tons or more).

When installing rails, a gap is provided between the end faces of the rails considering the amount of expansion of the rails in summer when they are exposed to high temperatures. When a train or freight car passes through the gap, the impact from wheels tends to cause battered rail ends. On the other hand, if continuously joined long rails (so-called long rails) are used, the number of gaps when installing the rails is reduced, which suppresses battered rail ends. As a result, the durability of the rails can be improved.

For this reason, it is considered to use long rails even for heavy haul railways. As used herein, a long rail is a rail with a total length of 200 m or more, which is obtained by joining the end faces of a plurality of pieces of rail base metal by flash-butt welding. For such a rail joined via welds, if the properties of the welds are much inferior to those of the rail base metal, fracture occurs at the welds when bending deformation is applied to the rail. In other words, if the properties of the welds are much inferior to those of the rail base metal, fracture occurs at the welds when a train or freight car passes, which is a problem.

Therefore, various studies have been carried out to improve the weldability of a rail. For example, JP 5659965 B (PTL 1) describes a flash-butt welding method in which the optimal amounts of C, Si and Mn and the length in the final part II flash process (the part of the process of flash-butt welding after preheating and just before upsetting) are specified.

JP 2010-188382 A (PTL 2) describes a method for cooling welds of a rail, which specifies a method for cooling the welds after welding the rail.

JP 2011-251335 A (PTL 3) describes a flash-butt welding method, including placing electrodes, which are cooled by contacting a conductor that has been cooled by a water-cooling pipe via an insulator, on the top and the bottom of rail steel and arranging the electrodes so that the distance between the end faces close to each other in the longitudinal direction of the rail is within 100 mm, then performing flash-butt welding, further cooling with the electrodes in an area sandwiched between a rail head and the electrodes in the longitudinal direction of the rail immediately after welding, and specifying the width of the heat-affect zone and the width of the softened area of welds.

All the methods described in the above-mentioned PTLS 1 to 3 merely control the composition, the upset amount during flash-butt welding, or the cooling method, and none of the methods describes improving the properties of the flash-butt welds themselves.

In this regard, JP 5532789 B (PTL 4) proposes a rail in which the hardness and the deflection of flash-butt welds are specified. In other words, PTL 4 proposes an appropriate range of the difference in hardness between flash-butt welds and rail base metal, and an appropriate range of the deflection in a bending test, respectively.

CITATION LIST

Patent Literature

PTL 1: JP 5659965 B
PTL 2: JP 2010-188382 A
PTL 3: JP 2011-251335 A
PTL 4: JP 5532789 B

SUMMARY

Technical Problem

It is possible to suppress the fracture at welds by specifying the difference in hardness between flash-butt welds and rail base metal and the deflection in a bending test as described in the above-mentioned PTL 4. PTL 4 describes controlling the chemical composition, the upset amount during flash-butt welding and the cooling as a method for obtaining such welds, which is similar to the methods described in PTLS 1 to 3.

However, with these conventional methods, it is difficult to stably manufacture rails having flash-butt welds with the difference in hardness and the deflection described above without variation in performance. In recent years, the operating environment of rails is becoming more severe, and, in order to extend the service life of rails, there has been a problem not only to improve the mechanical properties of a rail itself, such as wear resistance and rolling contact fatigue (RCF) resistance, but also to suppress the deterioration of the properties of welds by flash butt welding. Therefore, it is necessary to strictly regulate the welding conditions themselves.

It could thus be helpful to propose welding conditions under which welds are always stably formed, where the difference in hardness between flash-butt welds and rail base metal and the deflection in a bending test are in more appropriate ranges than those described in PTL 4. According to the present disclosure, it is possible to stably provide a rail having flush-butt welds with superior properties compared to conventional rail flush-butt welds.

Solution to Problem

To solve the above problems, we prepared flash-butt welds of a rail by varying the amount of welding heat input, and intensively investigated the hardness distribution of the rail and the difference between the hardness of rail base metal and the hardness of the welds. As a result, we discovered that, by setting the amount of welding heat input to $1.50 \times 10^5$ kA$^2$×sec or more and $4.50 \times 10^5$ kA$^2$×sec or less, the properties of flash-butt welds are improved, and the variation of properties of each weld is suppressed.

The amount of welding heat input is determined with the following equation (1).

Amount of welding heat input (kA$^2$×sec)=amount of heat input in initial flash process before preheating (kA$^2$×sec)+amount of heat input in preheating process (kA$^2$×sec)+amount of heat input in final flash process (kA$^2$×sec)     (1)

where amount of heat input in initial flash process before preheating=average current in initial flash process before preheating (kA)×average current in initial flash process before preheating (kA)×time of initial flash process before preheating (second), amount of heat input in preheating process=Σ(average current in i-th preheating process (kA)×average current in i-th preheating process (kA)×time of i-th preheating process (second)), where i is an arbitrary integer, and the preheating process is performed multiple times, and amount of heat input in final flash process=average current in final flash process (kA)×average current in final flash process (kA)×time of final flash process (second).

The present disclosure is based on the aforementioned discoveries. We thus provide the following.

1. A method of manufacturing a rail, comprising joining a plurality of pieces of rail base metal via welds formed by flash-butt welding, wherein the rail base metal comprises a chemical composition containing (consisting of)

C: 0.60 mass % to 1.20 mass %,
Si: 0.10 mass % to 1.50 mass %,
Mn: 0.10 mass % to 1.50 mass %, and
Cr: 0.10 mass % to 1.50 mass %,
with the balance being Fe and inevitable impurities, and
the flash-butt welding is performed with an amount of welding heat input of 1.50×10$^5$ kA$^2$×sec or more and 4.50×10$^5$ kA$^2$×sec or less.

2. The method of manufacturing a rail according to 1., wherein an absolute value of difference in hardness between the rail base metal and the welds in a surface layer from a surface of a rail head to a depth of 2.5 mm after the welding is 20 or less in Vickers hardness, and deflection of the welds is 20 mm or more.

3. The method of manufacturing a rail according to 1. or 2., wherein the chemical composition further contains at least one selected from the group consisting of V: 0.30 mass % or less,
Cu: 1.0 mass % or less,
Ni: 1.0 mass % or less,
Nb: 0.2 mass % or less,
Mo: 0.5 mass % or less,
Al: 0.07 mass % or less,
W: 1.0 mass % or less,
B: 0.005 mass % or less, and
Ti: 0.05 mass % or less.

4. A rail in which a plurality of pieces of rail base metal are joined via welds, wherein the rail base metal comprises a chemical composition containing (consisting of)

C: 0.60 mass % to 1.20 mass %,
Si: 0.10 mass % to 1.50 mass %,
Mn: 0.10 mass % to 1.50 mass %, and
Cr: 0.10 mass % to 1.50 mass %,
with the balance being Fe and inevitable impurities, and
an absolute value of difference in hardness between the rail base metal and the welds in a surface layer from a surface of a head of the rail to a depth of 2.5 mm is 20 or less in Vickers hardness, and deflection of the welds is 20 mm or more.

5. The rail according to 4., wherein the chemical composition further contains at least one selected from the group consisting of V: 0.30 mass % or less,
Cu: 1.0 mass % or less,
Ni: 1.0 mass % or less,
Nb: 0.2 mass % or less,
Mo: 0.5 mass % or less,
Al: 0.07 mass % or less,
W: 1.0 mass % or less,
B: 0.005 mass % or less, and
Ti: 0.05 mass % or less.

Advantageous Effect

According to the present disclosure, it is possible to stably manufacture a rail joined by flash-butt welds that are far superior to conventional welds of a rail, and to increase the length of a rail without deteriorating the properties of welds by flash-butt welding. As a result, the present disclosure contributes to extending the service life of rails installed in heavy haul railways and to preventing railway accidents, which is beneficial in industrial terms.

DETAILED DESCRIPTION

Figure 1:
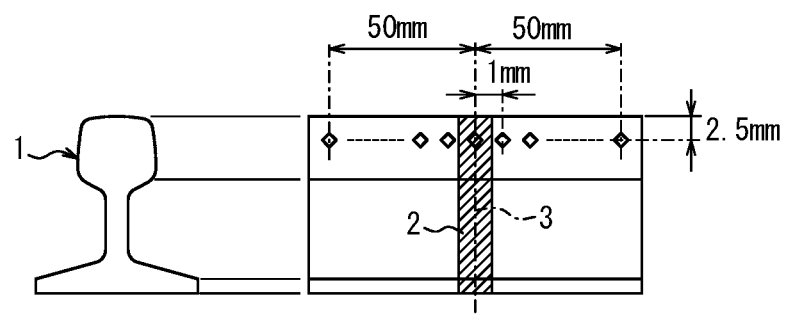
FIG. 1 schematically illustrates a measurement position of the hardness of rail base metal and of welds.

The following describes the method for manufacturing a rail of the present disclosure, first about the reasons for limiting the chemical composition of the rail base metal.

[Chemical Composition of Rail Base Metal]

C: 0.60 Mass % to 1.20 Mass %

C is an essential element for forming cementite in a pearlitic structure and ensuring the strength of flash-butt welds of rail steel. However, when the C content is less than 0.60 mass %, it is difficult to ensure the strength of flash-butt welds of rail steel, which deteriorates the properties of the flash-butt welds. On the other hand, when the C content exceeds 1.20 mass %, the properties of the flash-butt welds are significantly deteriorated due to the formation of proeutectoid cementite at austenite grain boundaries in the flash-butt welds. Therefore, the C content is set to 0.60 mass % to 1.20 mass %. The C content is preferably 0.70 mass % or more. The C content is preferably 1.10 mass % or less. The C content is more preferably 0.70 mass % to 1.10 mass %.

Si: 0.10 Mass % to 1.50 Mass %

Si is added as a deoxidizing agent, but its effect is insufficient when the Si content is less than 0.10 mass %. On the other hand, when the content exceeds 1.50 mass %, oxides are formed in the rail steel because of the high binding force of Si with oxygen, and the oxides remain in the welds after flash-butt welding, resulting in deterioration of the properties of the flash-butt welds. Further, it is difficult for the scale formed in the welds that has been heated to a high temperature during the flash-butt welding to peel away, and it is difficult to remove the formed scale by upsetting during the welding. As a result, the scale tends to remain in the welds, and the welds cannot exhibit good performance. Therefore, the Si content is set to 0.10 mass % to 1.50 mass %. The Si content is preferably 0.15 mass % or more. The Si content is preferably 1.45 mass % or less. The Si content is more preferably 0.15 mass % to 1.45 mass %.

Mn: 0.10 Mass % to 1.50 Mass %

Mn contributes to increasing the strength of the flash-butt welds by lowering the pearlite transformation temperature and reducing lamellar spacing. Therefore, Mn is added in an amount of 0.10 mass % or more. On the other hand, when the Mn content exceeds 1.50 mass %, hardening and embrittlement of welds occur after the flash-butt welding, which deteriorates the properties of the welds. Therefore, the Mn content is set to 0.10 mass % to 1.50 mass %. The Mn content is preferably 0.15 mass % or more. The Mn content is preferably 1.45 mass % or less. The Mn content is more preferably 0.15 mass % to 1.45 mass %.

Cr: 0.10 Mass % to 1.50 Mass %

Cr is an element that increases the strength of the flash-butt welds of the rail, which is added in an amount of 0.10 mass % or more. On the other hand, when the Cr content exceeds 1.50 mass %, it is difficult for the scale formed in the welds that has been heated to a high temperature during the flash-butt welding to peel away, and it is difficult to remove the formed scale by upsetting during the welding. As a result, the scale tends to remain in the welds, and the welds cannot exhibit good performance. Therefore, the Cr content is set to 0.10 mass % to 1.50 mass %. The Cr content is preferably 0.15 mass % or more. The Cr content is preferably 1.45 mass % or less. The Cr content is more preferably 0.15 mass % to 1.45 mass %.

The balance other than the aforementioned components is Fe and inevitable impurities.

In addition to the basic components described above, the following elements may be further added to the rail base metal of the present disclosure to further increase the hardness of the welds.

That is, it can further contain, as necessary, at least one selected from the group consisting V: 0.30 mass % or less,
Cu: 1.0 mass % or less,
Ni: 1.0 mass % or less,
Nb: 0.2 mass % or less,
Mo: 0.5 mass % or less,
Al: 0.07 mass % or less,
W: 1.0 mass % or less,
B: 0.005 mass % or less, and
Ti: 0.05 mass % or less.

V: 0.30 Mass % or Less

V forms carbonitrides and is dispersed and precipitated in the base to increase the strength of the flash-butt welds of the rail. Therefore, it is desirable to add V in an amount of 0.005 mass % or more. On the other hand, when the V content exceeds 0.30 mass %, the aforementioned effect is saturated, and the alloy cost increases. Therefore, when V is added, the V content is preferably set to 0.30 mass % or less.

Cu: 1.0 Mass % or Less

Cu is an element that further increases the strength of the flash-butt welds of the rail by solid solution strengthening. Therefore, it is desirable to add Cu in an amount of 0.005 mass % or more. On the other hand, when the Cu content exceeds 1.0 mass %, cracking by Cu is likely to occur during the flash-butt welding. Therefore, when Cu is added, the Cu content is preferably set to 1.0 mass % or less.

Ni: 1.0 Mass % or Less

Ni is an element that increases the strength of the flash-butt welds of the rail without deteriorating the ductility. Because cracking by Cu during the flash-butt welding is suppressed by adding Ni in combination with Cu, it is desirable to add Ni as well when Cu is added. Therefore, it is desirable to add Ni in an amount of 0.005 mass % or more. On the other hand, when the Ni content exceeds 1.0 mass %, the aforementioned effect is saturated, and the alloy cost increases. Therefore, when Ni is added, the Ni content is preferably set to 1.0 mass % or less.

Nb: 0.2 Mass % or Less

Nb combines with C and N in the steel and precipitates as carbides, nitrides or carbonitrides during and after rolling, which can increase the hardness of the flash-butt welds of the rail. Therefore, it is desirable to add Nb in an amount of 0.005 mass % or more. On the other hand, when the Nb content exceeds 0.2 mass %, the aforementioned effect is saturated, and the alloy cost increases. Therefore, when Nb is added, the Nb content is preferably set to 0.2 mass % or less.

Mo: 0.5 Mass % or Less

Mo is an element that further increases the strength of the flash-butt welds of the rail by solid solution strengthening. Therefore, it is desirable to add Mo in an amount of 0.005 mass % or more. On the other hand, when the Mo content exceeds 0.5 mass %, the aforementioned effect is saturated, and the alloy cost increases. Therefore, when Mo is added, the Mo content is preferably set to 0.5 mass % or less.

Al: 0.07 Mass % or Less

Al is an element added as a deoxidation agent. Therefore, it is preferable to add Al in an amount of 0.001 mass % or more. On the other hand, when the Al content exceeds 0.07 mass %, the aforementioned effect is saturated, and the alloy cost increases. Therefore, when Al is added, the Al content is preferably set to 0.07 mass % or less.

W: 1.0 Mass % or Less

W is an element that precipitates as carbides to further increase the strength of the flash-butt welds of the rail by strengthening by precipitation. Therefore, it is preferable to add W in an amount of 0.001 mass % or more. On the other hand, when the W content exceeds 1.0 mass %, the aforementioned effect is saturated, and the alloy cost increases. Therefore, when W is added, the W content is preferably set to 1.0 mass % or less.

B: 0.005 Mass % or Less

B is an element that precipitates as nitrides to further increase the strength of the flash-butt welds of the rail by strengthening by precipitation. Therefore, it is preferable to add B in an amount of 0.0001 mass % or more. However, when the B content exceeds 0.005 mass %, the aforementioned effect is saturated, and the alloy cost increases. Therefore, when B is added, the B content is preferably set to 0.005 mass % or less.

Ti: 0.05 Mass % or Less.

Ti is an element that precipitates as carbides, nitrides or carbonitrides to further increase the strength of the flash-butt welds of the rail by strengthening by precipitation. Therefore, it is preferable to add Ti in an amount of 0.001 mass % or more. On the other hand, when the Ti content exceeds 0.05 mass %, the aforementioned effect is saturated, and the alloy cost increases. Therefore, when Ti is added, the Ti content is preferably set to 0.05 mass % or less.

A plurality of pieces of rail base metal having the chemical composition described above are joined via welds formed by flash-butt welding to obtain a long rail. The following describes the welding conditions in detail. The rail base metal may be any rail base metal as long as it has the chemical composition described above, and it may be a rail produced by a normal process. In other words, the rail base metal may be a rail produced by, after steelmaking a steel having a predetermined chemical composition, casting the steel to obtain a bloom, and using the bloom as a raw material and subjecting it to hot rolling using caliber rolls to obtain a rail. The hot rail may be subjected to slack quenching after the hot rolling if necessary. The rail may also be straightened if necessary.

[Welding Conditions]

Amount of welding heat input: $1.50 \times 10^5$ $kA^2 \times sec$ or more and $4.50 \times 10^5$ $kA^2 \times sec$ or less When a railway vehicle is running on a rail, the rail is applied with a vertical downward load, which causes deflection of the rail. Here, when the amount of welding heat input is less than $1.50 \times 10^5$ $kA^2 \times sec$, the amount of welding heat input is small, the welds are hardened, and the difference in hardness between the rail base metal and the welds increases. As a result, the deflection under load is reduced. Therefore, when a railway vehicle runs on the rail and wheels pass through the welds and a large load is applied to the welds of the rail, the load cannot be absorbed by the deflection of the welds, which causes fracture at the rail welds. Therefore, to suppress fracture at the welds of the rail, the amount of welding heat input is secured at $1.50 \times 10^5$ $kA^2 \times sec$ or more. On the other hand, when the amount of welding heat input exceeds $4.50 \times 10^5$ $kA^2 \times sec$, the amount of welding heat input is too large, the hardness of the welds decreases, and the difference in hardness between the rail base metal and the welds also increases. As a result, local wear occurs at the welds, and when a railway vehicle runs on the rail and wheels pass through the welds and a large load is applied to the welds of the rail, fracture occurs at the rail welds. Therefore, to suppress fracture at the rail welds, it is necessary to set the amount of welding heat input to $1.50 \times 10^5$ $kA^2 \times sec$ or more and $4.50 \times 10^5$ $kA^2 \times sec$ or less. The amount of welding heat input is preferably $1.55 \times 10^5$ $kA^2 \times sec$ or more. The amount of welding heat input is preferably $4.45 \times 10^5$ $kA^2 \times sec$ or less. The amount of welding heat input is more preferably $1.55 \times 10^5$ $kA^2 \times sec$ or more and $4.45 \times 10^5$ $kA^2 \times sec$ or less.

In the present disclosure, it is essential to regulate the amount of welding heat input during flash-butt welding within the ranges described above, and other welding conditions may be in accordance with those of general rail manufacturing. In other words, flash-butt welding generally includes an initial flash process before preheating, a preheating process, a final flash process, and an upsetting process. The amount of welding heat input is then the sum of the amounts of heat input in the initial flash process before preheating, the preheating process and the final flash process. Further, the flash-butt welding machine may be any welding machine manufactured by Chemetron Railway Products, Inc., Schlatter Industries AG or the like.

The following describes the method of calculating the amount of welding heat input during flash-butt welding in detail. That is, it is calculated with the average current (kA) in the initial flash process before preheating and the time (second) of the initial flash process before preheating, the average current (kA) in each preheating process and the time (second) of each preheating process, and the average current (kA) in the final flash process and the time (second) of the final flash process. Because the preheating process is performed by flowing current for i times, where i is an arbitrary integer of two or more, for heating (performing heating for multiple times), it is "each preheating process". With the above, the amount of welding heat input can be determined with the following equation (1).

[Amount of welding heat input ($kA^2 \times sec$)]=amount of heat input in initial flash process before preheating ($kA^2 \times sec$)+amount of heat input in preheating process ($kA^2 \times sec$)+amount of heat input in final flash process ($kA^2 \times sec$) (1)

where amount of heat input in initial flash process before preheating=average current in initial flash process before preheating (kA)×average current in initial flash process before preheating (kA)×time of initial flash process before preheating (second), amount of heat input in preheating process=Σ(average current in i-th preheating process (kA)×average current in i-th preheating process (kA)×time of i-th preheating process (second)), where the preheating process is performed multiple times, and amount of heat input in final flash process=average current in final flash process (kA)×average current in final flash process (kA)×time of final flash process (second).

To control the amount of welding heat input thus determined within the above ranges, it is necessary to control the current and time in each welding process and the number of times of the preheating process.

After the final flash process is completed with the desired amount of welding heat input, it is preferable to perform upsetting at a pressure of 45 tons to 75 tons in the upsetting process. After the flash-butt welding, it is allowed to natural cooling or air cooling. For example, air cooling may be performed 10 seconds to 70 seconds after the end of the flash-butt welding at an air pressure of 5 psi to 20 psi for 15 seconds to 60 seconds.

The welds obtained by the welding with the amount of welding heat input described above satisfy the following properties: an absolute value of the difference in hardness between the rail base metal and the welds in a surface layer from a surface of a rail head to a depth of 2.5 mm (hereafter may be simply referred to as "surface layer") after the welding is 20 or less in Vickers hardness, and the deflection of the welds is 20 mm or more.

[Absolute Value of Difference ΔH Between Hardness of Rail Base Metal and Hardness of Weld: 20 or Less]

The hardness of the rail base metal and of the welds in the surface layer in this specification is measured as described below as a Vickers hardness at a position of a depth of 2.5 mm from the surface of the rail head after manufacturing. From the measured values, the difference in hardness ΔH is calculated by [hardness of base metal]−[hardness of weld]. When the ΔH exceeds +20, it indicates that the hardness of the welds is low. As described above, local wear occurs at the welds, causing fracture at the welds. On the other hand, when the difference in hardness ΔH is below −20, it indicates that the hardness of the welds is much higher than that of the base metal. As described above, when wheels pass through the welds, a large load is applied to the rail welds, causing fracture at the rail welds. Even if fracture occurs at the welds, the welds protrude from the surface as wear of the rail base metal develops. As a result, it is necessary to grind the protrusion with a grinder or the like. Therefore, the absolute value of the difference in hardness ΔH between the rail base metal and the welds is set to 20 or less in Vickers hardness.

[Deflection: 20 mm or More]

The deflection of the rail of the present disclosure in the bending test described below is 20 mm or more. In other words, in a case where the deflection is less than 20 mm, when a railway vehicle runs on the rail and wheels pass through the welds, a large load, which cannot be absorbed by the deflection of the welds, is applied to the welds of the rail, causing fracture at the rail welds. Therefore, the deflection is set to 20 mm or more.

[Hardness Test]

As illustrated in FIG. 1, the hardness test is performed at a position of a depth of 2.5 mm from the surface of a rail head of a manufactured rail 1 over a range from the center of a weld 2, which is a joining interface 3 between two pieces of rail base metal, to 50 mm on both sides in the longitudinal direction of the rail to measure the Vickers hardness at a load of 98 N and a pitch of 1 mm. The average of the measured values of the rail base metal is the hardness of the base metal, the average of the measured values of the welds is the hardness of the welds, and the difference in hardness ΔH is calculated by [hardness of base metal]–[hardness of weld].

[Bending Test]

Figure 2:
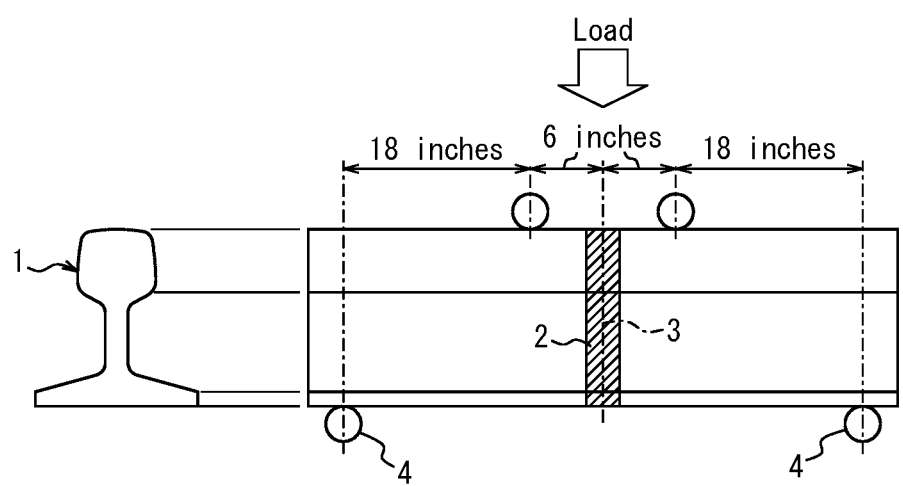
FIG. 2 schematically illustrates a bending test.

The bending test is performed in accordance with the American Railway Engineering and Maintenance-of-Way Association standard: AREMA-sec.2.3.3.6. In other words, as illustrated in FIG. 2, a load is applied with the distance between fulcrums 4 being 24 inches on both sides from the center of the weld 2 (that is, the joining interface 3 between two pieces of rail base metal), and the deflection until fracture occurs is measured. In the present disclosure, the properties of the welds are judged to be good when the deflection is 20 mm or more.

EXAMPLES

Example 1

Flash-butt welding was performed using rail base metal having the chemical composition listed in Table 1 (Disclosed Steel A-1) with the amount of welding heat input listed in Table 2. The difference in hardness ΔH between rail base metal and welds, and the deflection in the bending test were investigated as described above. All the flash-butt welding was performed with DC Rail Welder #923 manufactured by Chemetron Railway Products, Inc. In addition, air cooling was performed 50 seconds after the end of the welding at an air pressure of 10 psi for 45 seconds.

Figure 3:
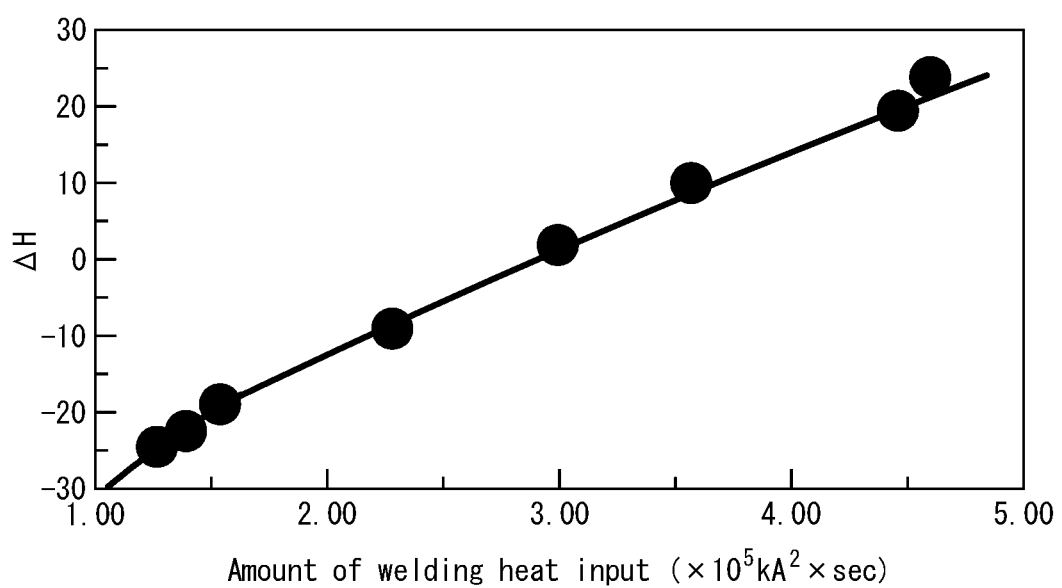
FIG. 3 illustrates the relationship between the amount of heat input during flash-butt welding and the difference in hardness between rail base metal and flash-butt welds.
Figure 4:
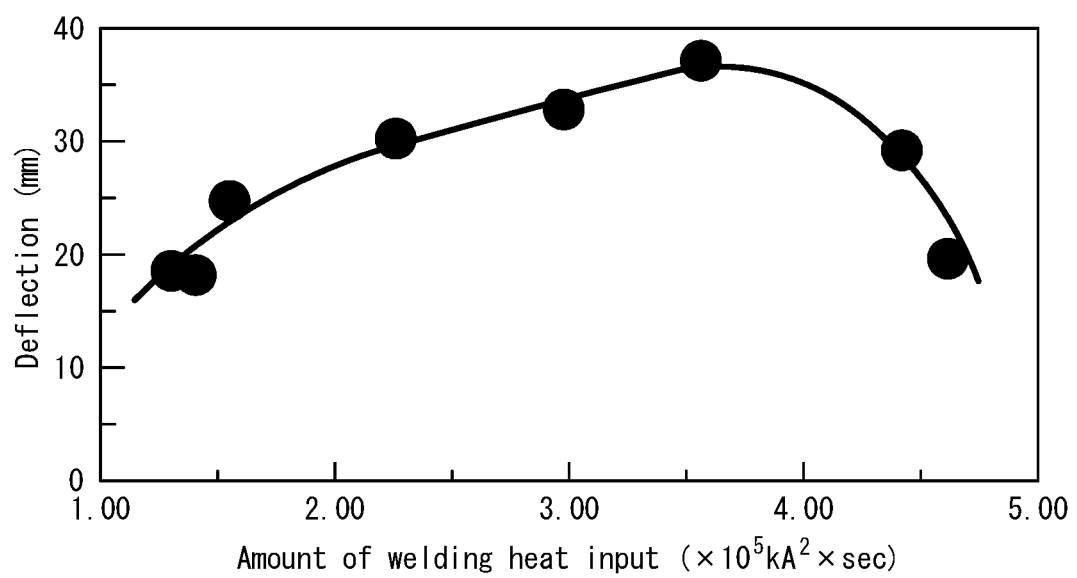
FIG. 4 illustrates the relationship between the amount of heat input during flash-butt welding and the deflection in the bending test.

The measurement results of the ΔH and the deflection are listed in Table 2. Further, FIG. 3 illustrates the relationship between the amount of heat input during the flash-butt welding and the difference in hardness ΔH between rail base metal and flash-butt welds, and FIG. 4 illustrates the relationship between the amount of heat input during the flash-butt welding and the deflection in the bending test.

In addition, the resistance to fracture at the welds of the obtained rail was investigated as follows. That is, because the properties of the welds are judged to be good when the deflection is 20 mm or more in the present disclosure, the presence or absence of fracture was checked in the rail at deflection of 20 mm. On the other hand, in order to investigate the properties of the welds themselves in the present disclosure, the test, even if the deflection was 20 mm or more, was continued without interrupting until the rail fractured, and the deflection at the time of fracture was investigated.

TABLE 1

| | (mass %) | | | | |
|---|---|---|---|---|---|
| | C | Si | Mn | Cr | Remarks |
| A-1 | 0.84 | 0.55 | 0.61 | 0.71 | Example Steel |

TABLE 2

| No. | Steel sample No. | Amount of welding heat input ($\times 10^5$ kA$^2$ × sec) | ΔH | Deflection (mm) | Presence of rail fracture at deflection of 20 mm | Remarks |
|---|---|---|---|---|---|---|
| 1 | A-1 | 1.32 | −25 | 18.0 | Yes | Comparative Example |
| 2 | A-1 | 1.40 | −23 | 18.1 | Yes | Comparative Example |
| 3 | A-1 | 1.55 | −19 | 24.9 | No | Example |
| 4 | A-1 | 2.27 | −9 | 30.0 | No | Example |
| 5 | A-1 | 2.99 | 2 | 33.0 | No | Example |
| 6 | A-1 | 3.56 | 10 | 37.0 | No | Example |
| 7 | A-1 | 4.45 | 19 | 29.0 | No | Example |
| 8 | A-1 | 4.60 | 24 | 19.5 | Yes | Comparative Example |

It is clear from Table 2 and FIGS. 3 and 4 that, when the amount of welding heat input was $1.50 \times 10^5$ kA$^2$×sec or more and $4.5 \times 10^5$ kA$^2$×sec or less, good flash-butt welds could be formed, and when the deflection was secured to 20 mm or more, the rail did not fracture at deflection of 20 mm.

Example 2

Flash-butt welding was performed using rail base metal having the chemical composition listed in Table 3 (Disclosed Steels B-1 to B-10 and B-19 to B-26, and Comparative Steels B-11 to B-18), and the difference in hardness ΔH between rail base metal and welds, and the deflection in the bending test were investigated as in Example 1. The results are listed in Table 4.

TABLE 3

| Steel sample No. | C | Si | Mn | Cr | V | Cu | Ni | Nb | Mo | Al | W | B | Ti | Remarks |
|---|---|---|---|---|---|---|---|---|---|---|---|---|---|---|
| B-1 | 0.83 | 1.50 | 0.48 | 0.26 | — | — | — | — | — | — | — | — | — | Example Steel |
| B-2 | 1.09 | 0.25 | 0.85 | 0.61 | — | — | — | — | — | — | — | — | — | Example Steel |
| B-3 | 0.70 | 0.42 | 0.40 | 1.50 | — | — | — | — | — | — | — | — | — | Example Steel |
| B-4 | 0.84 | 0.88 | 0.46 | 0.79 | — | — | — | — | — | — | — | — | — | Example Steel |
| B-5 | 0.83 | 0.87 | 0.47 | 1.46 | — | — | — | — | — | — | — | — | — | Example Steel |
| B-6 | 1.10 | 0.42 | 0.54 | 0.21 | — | — | — | — | — | — | — | — | — | Example Steel |
| B-7 | 0.81 | 0.69 | 0.56 | 0.79 | — | — | — | — | — | — | — | — | — | Example Steel |
| B-8 | 0.71 | 1.16 | 1.34 | 0.88 | — | — | — | — | — | — | — | — | — | Example Steel |
| B-9 | 0.84 | 1.06 | 0.83 | 0.10 | — | — | — | — | — | — | — | — | — | Example Steel |
| B-10 | 0.85 | 0.48 | 0.71 | 0.32 | — | — | — | — | — | — | — | — | — | Example Steel |
| B-11 | <u>0.59</u> | 0.65 | 0.81 | 0.77 | — | — | — | — | — | — | — | — | — | Comparative Steel |
| B-12 | <u>1.21</u> | 0.24 | 0.81 | 0.22 | — | — | — | — | — | — | — | — | — | Comparative Steel |
| B-13 | 0.72 | <u>0.05</u> | 0.81 | 0.21 | — | — | — | — | — | — | — | — | — | Comparative Steel |
| B-14 | 0.82 | <u>1.52</u> | 0.82 | 0.99 | — | — | — | — | — | — | — | — | — | Comparative Steel |
| B-15 | 0.72 | <u>0.25</u> | <u>0.05</u> | 0.18 | — | — | — | — | — | — | — | — | — | Comparative Steel |
| B-16 | 0.84 | 0.29 | <u>1.52</u> | 0.99 | — | — | — | — | — | — | — | — | — | Comparative Steel |
| B-17 | 0.81 | 0.63 | 0.81 | <u>0.01</u> | — | — | — | — | — | — | — | — | — | Comparative Steel |
| B-18 | 0.85 | 0.59 | 0.81 | <u>1.52</u> | — | — | — | — | — | — | — | — | — | Comparative Steel |
| B-19 | 0.84 | 0.55 | 0.55 | 0.79 | — | — | — | 0.05 | — | — | — | — | — | Example Steel |
| B-20 | 0.84 | 0.51 | 0.61 | 0.74 | — | — | — | 0.15 | — | — | — | — | — | Example Steel |
| B-21 | 0.84 | 0.25 | 1.10 | 0.25 | — | — | — | — | 0.04 | — | — | — | — | Example Steel |
| B-22 | 0.84 | 0.35 | 1.05 | 0.29 | — | — | 0.30 | — | — | — | — | — | — | Example Steel |
| B-23 | 0.84 | 0.55 | 0.55 | 0.62 | 0.30 | 0.50 | — | — | — | — | — | — | — | Example Steel |
| B-24 | 0.84 | 0.25 | 1.20 | 0.29 | — | — | — | — | — | 0.07 | 0.60 | — | — | Example Steel |
| B-25 | 0.84 | 0.88 | 0.55 | 0.45 | — | — | — | — | — | — | — | 0.003 | 0.05 | Example Steel |
| B-26 | 0.84 | 0.95 | 0.56 | 0.79 | — | — | — | 0.05 | — | — | — | — | — | Example Steel |

Note)
The underlined part indicates that it is out of the range of the present disclosure.

TABLE 4

| No. | Steel sample No. | Amount of welding heat input ($\times 10^5$ kA$^2$ × sec) | ΔH | Deflection (mm) | Presence of rail fracture at deflection of 20 mm | Remarks |
|---|---|---|---|---|---|---|
| 1 | B-1 | 1.32 | −25 | 18.0 | Yes | Comparative Example |
| 2 | B-2 | 2.59 | 5 | 32.3 | No | Example |
| 3 | B-3 | 2.89 | 10 | 33.8 | No | Example |
| 4 | B-4 | 3.00 | 5 | 34.3 | No | Example |
| 5 | B-5 | 4.45 | 19 | 29.5 | No | Example |
| 6 | B-6 | 2.88 | −5 | 33.8 | No | Example |
| 7 | B-7 | 2.98 | 8 | 34.2 | No | Example |
| 8 | B-8 | 2.78 | 11 | 33.3 | No | Example |
| 9 | B-9 | 2.69 | 15 | 32.8 | No | Example |
| 10 | B-10 | 2.84 | 12 | 33.6 | No | Example |
| 11 | B-11 | 2.57 | 28 | 19.1 | Yes | Comparative Example |
| 12 | B-12 | 2.55 | −26 | 18.2 | Yes | Comparative Example |
| 13 | B-13 | 2.54 | 22 | 19.3 | Yes | Comparative Example |
| 14 | B-14 | 2.56 | −23 | 18.8 | Yes | Comparative Example |
| 15 | B-15 | 2.54 | 21 | 19.3 | Yes | Comparative Example |
| 16 | B-16 | 2.58 | −23 | 18.7 | Yes | Comparative Example |
| 17 | B-17 | 2.58 | 24 | 19.2 | Yes | Comparative Example |
| 18 | B-18 | 2.55 | −27 | 18.3 | Yes | Comparative Example |
| 19 | B-19 | 3.01 | 5 | 34.3 | No | Example |
| 20 | B-20 | 3.29 | 8 | 35.3 | No | Example |
| 21 | B-21 | 3.38 | −6 | 35.5 | No | Example |
| 22 | B-22 | 2.99 | −3 | 34.2 | No | Example |
| 23 | B-23 | 2.71 | −10 | 32.9 | No | Example |
| 24 | B-24 | 3.10 | −12 | 34.7 | No | Example |
| 25 | B-25 | 2.68 | −5 | 32.8 | No | Example |
| 26 | B-26 | 2.84 | −2 | 33.6 | No | Example |

It is clear from Table 4 that the rail obtained with the manufacturing method of the present disclosure does not fracture at deflection of 20 mm, and that a rail having welds with good properties can be stably obtained with the manufacturing method of the present disclosure. None of the rails of Examples having the predetermined chemical composition, the difference in hardness ΔH and the deflection specified in the present disclosure fractured at deflection of 20 mm. On the other hand, for the rails of Comparative Examples that did not meet the conditions of the present disclosure, the difference in hardness ΔH between rail base material and welds or the deflection in the bending test did not reach a satisfactory level, and fracture occurred at deflection of less than 20 mm.

INDUSTRIAL APPLICABILITY

A rail manufactured according to the present disclosure contributes to extending the service life of rails installed in heavy haul railways and to preventing railway accidents, which is beneficial in industrial terms.

The invention claimed is:

1. A method of manufacturing a rail, comprising joining a plurality of pieces of rail base metal via welds formed by flash-butt welding, wherein the rail base metal comprises a chemical composition containing C: 0.60 mass % to 1.20 mass %,
Si: 0.10 mass % to 1.50 mass %,
Mn: 0.10 mass % to 1.50 mass %, and
Cr: 0.10 mass % to 1.50 mass %, with the balance being Fe and inevitable impurities, the flash-butt welding is performed with an amount of welding heat input of $1.50 \times 10^5$ kA$^2 \times$sec or more and $4.50 \times 10^5$ kA$^2 \times$sec or less, an absolute value of difference in hardness between the rail base metal and the welds in a surface layer from a surface of a rail head to a depth of 2.5 mm after the welding is 20 or less in Vickers hardness, and deflection of the welds is 20 mm or more.

2. The method of manufacturing a rail according to claim 1, wherein the chemical composition further contains at least one selected from the group consisting of V: 0.30 mass % or less,
Cu: 1.0 mass % or less,
Ni: 1.0 mass % or less,
Nb: 0.2 mass % or less,
Mo: 0.5 mass % or less,
Al: 0.07 mass % or less,
W: 1.0 mass % or less,
B: 0.005 mass % or less, and
Ti: 0.05 mass % or less.

3. A rail in which a plurality of pieces of rail base metal are joined via welds, wherein the rail base metal comprises a chemical composition containing C: 0.60 mass % to 1.20 mass %,
Si: 0.10 mass % to 1.50 mass %,
Mn: 0.10 mass % to 1.50 mass %, and
Cr: 0.10 mass % to 1.50 mass %, with the balance being Fe and inevitable impurities, and an absolute value of difference in hardness between the rail base metal and the welds in a surface layer from a surface of a head of the rail to a depth of 2.5 mm is 20 or less in Vickers hardness, and deflection of the welds is 20 mm or more.

4. The rail according to claim 3, wherein the chemical composition further contains at least one selected from the group consisting of V: 0.30 mass % or less,
Cu: 1.0 mass % or less,
Ni: 1.0 mass % or less,
Nb: 0.2 mass % or less,
Mo: 0.5 mass % or less,
Al: 0.07 mass % or less,
W: 1.0 mass % or less,
B: 0.005 mass % or less, and
Ti: 0.05 mass % or less.

* * * * *